United States Patent [19]

Hansson

[11] Patent Number: 5,329,066
[45] Date of Patent: Jul. 12, 1994

[54] SCREENED COAXIAL CABLE THROUGH-LET

[75] Inventor: Kjell O. Hansson, Sollentuna, Sweden

[73] Assignee: Telefonaktiebolaget L M Ericsson, Stockholm, Sweden

[21] Appl. No.: 950,663

[22] Filed: Sep. 25, 1992

[30] Foreign Application Priority Data

Sep. 27, 1991 [SE] Sweden .................... 9102821

[51] Int. Cl.⁵ .................................. H01B 17/26
[52] U.S. Cl. ........................ 174/151; 174/35 R; 439/608
[58] Field of Search .................... 174/32–34, 174/35 R, 35 MS, 68.1, 261–265, 268, 102 R, 102 C, 102 SP, 65 R, 137 R, 151, 152 R, 153 R; 248/56; 307/89–91; 333/12; 340/288, 310 R, 310 A, 310 LP; 343/713, 888; 439/607, 608, 609, 610

[56] References Cited

U.S. PATENT DOCUMENTS

| 3,168,612 | 2/1965 | Sorenson | 174/57 |
| 4,313,044 | 1/1982 | Staats | 174/35 MS X |
| 4,576,431 | 3/1986 | Thayer | 174/52 R X |
| 4,577,054 | 3/1986 | de Ronde | 174/35 C |
| 4,656,313 | 4/1987 | Moore et al. | 174/35 R |
| 4,677,253 | 6/1987 | Blomqvist | 174/35 R |
| 4,824,398 | 4/1989 | Taylor | 439/557 |
| 4,840,584 | 6/1989 | Cox | 439/538 |
| 4,872,212 | 10/1989 | Roos et al. | 174/35 R X |
| 5,112,251 | 5/1992 | Cesar | 439/607 |
| 5,170,017 | 12/1992 | Stanevich et al. | 174/151 X |
| 5,228,871 | 7/1993 | Goodman | 434/607 |

FOREIGN PATENT DOCUMENTS 441795 9/1985 Sweden .

Primary Examiner—Leo P. Picard
Assistant Examiner—Christopher Horgan
Attorney, Agent, or Firm—Burns, Doane, Swecker & Mathis

[57] ABSTRACT

A coaxial cable through-let for screening signals transmitted between two mutually adjacent, screened spaces includes a coaxial cable having electrical contact devices at each end thereof for signal transmission, and a screening plate which surrounds the cable and which is intended to be positioned between the two spaces in recesses provided in mutually facing side-walls thereof. The screening plate comprises two substantially identical plate-halves, each of which includes a flat, rectangular plate having resilient tongues disposed along three sides thereof, and a centrally placed hollow, wherein the heights of the hollows correspond to half the distance between the spaces. An opening for accommodating the coaxial cable is arranged centrally in the hollow, and the two plate-halves are soldered together at their mutually facing hollows and also in the opening at the screen of the coaxial cable at a part from which the cable sheath has been stripped.

3 Claims, 2 Drawing Sheets

SCREENED COAXIAL CABLE THROUGH-LET

TECHNICAL FIELD

The present invention relates to a coaxial cable through-let for screening the transmission of signals between two mutually adjacent, screened spaces, comprising a coaxial cable having electrical contact devices at each end for signal transmission, and a screening plate which surrounds the cable and which is intended for insertion between the two spaces, in recesses provided in mutually facing side-walls thereof.

BACKGROUND ART

Coaxial cable through-lets are known to the art. These known through-lets, however, are often of complicated construction and the work involved when fitting the actual through-let and in fitting the same to the equipment associated therewith is time-consuming. As a result, it is difficult to achieve complete screening around the through-let.

DISCLOSURE OF THE INVENTION

The object of the present invention is to provide a screen through-let of the aforesaid kind which is of simple and reliable construction and which requires no time-consuming working procedures when fitting the through-let, and which can be applied to associated equipment both simply and quickly while, nevertheless, providing a completely safe screen. This is achieved by giving the through-let the characteristic features set forth in the following claims.

Thus, the advantages afforded by an inventive through-let reside in a simple construction comprising only a few parts, reliable screening and rapid fitting and application of the through-let.

Further objects of the invention and advantages afforded thereby will be apparent from the following description, in which the invention is described in more detail with reference to a preferred exemplifying embodiment thereof and also with reference to the accompanying drawings.

BRIEF DESCRIPTION OF THE DRAWINGS

FIGS. 2, 2a and 2b illustrate a screening plate forming part of the through-let, in top view and from two different sides respectively.

BEST MODE OF CARRYING OUT THE INVENTION

Figure 1:
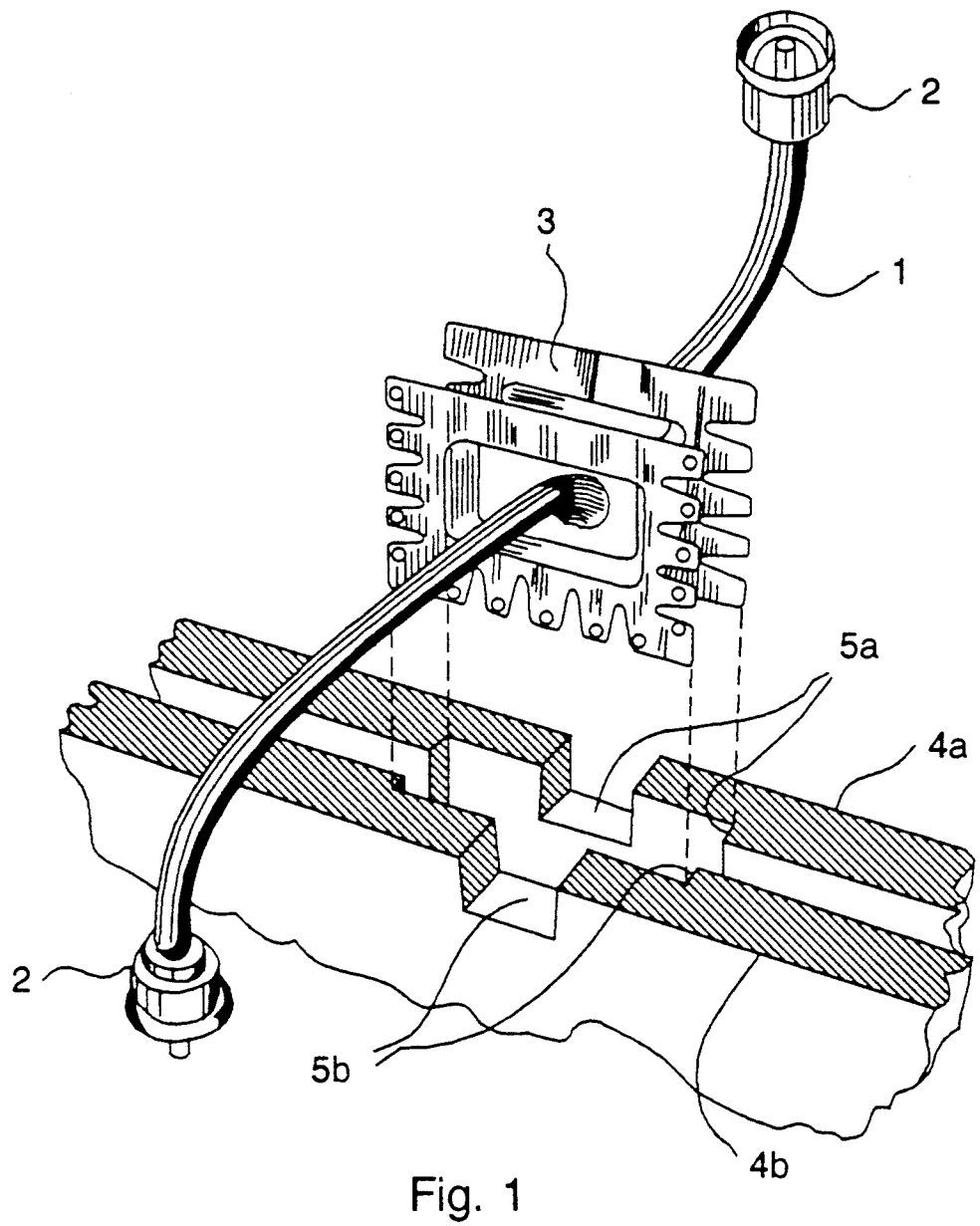
FIG. 1 is a perspective view of an inventive coaxial cable through-let and illustrates the through-let positioned between two spaces.

FIG. 1 shows the inventive coaxial cable through-let in perspective and illustrates schematically the through-let mounted between two screened spaces, of which only a part of their defining side-walls is shown. The through-let includes a coaxial cable 1 for transmission of signals between the spaces. Fitted to each end of the cable is an electric contact device 2 of known kind, by means of which the coaxial cable can be connected to equipment located in the two spaces. The through-let also includes a screening plate 3 which screens around the coaxial cable between the spaces and which is intended to lie in screening or shielding contact with the outer surface of the side-walls of respective spaces. The side-walls 4a and 4b are provided with recesses 5a and 5b, into which the screening plate 3 is pressed down.

Figure 2:
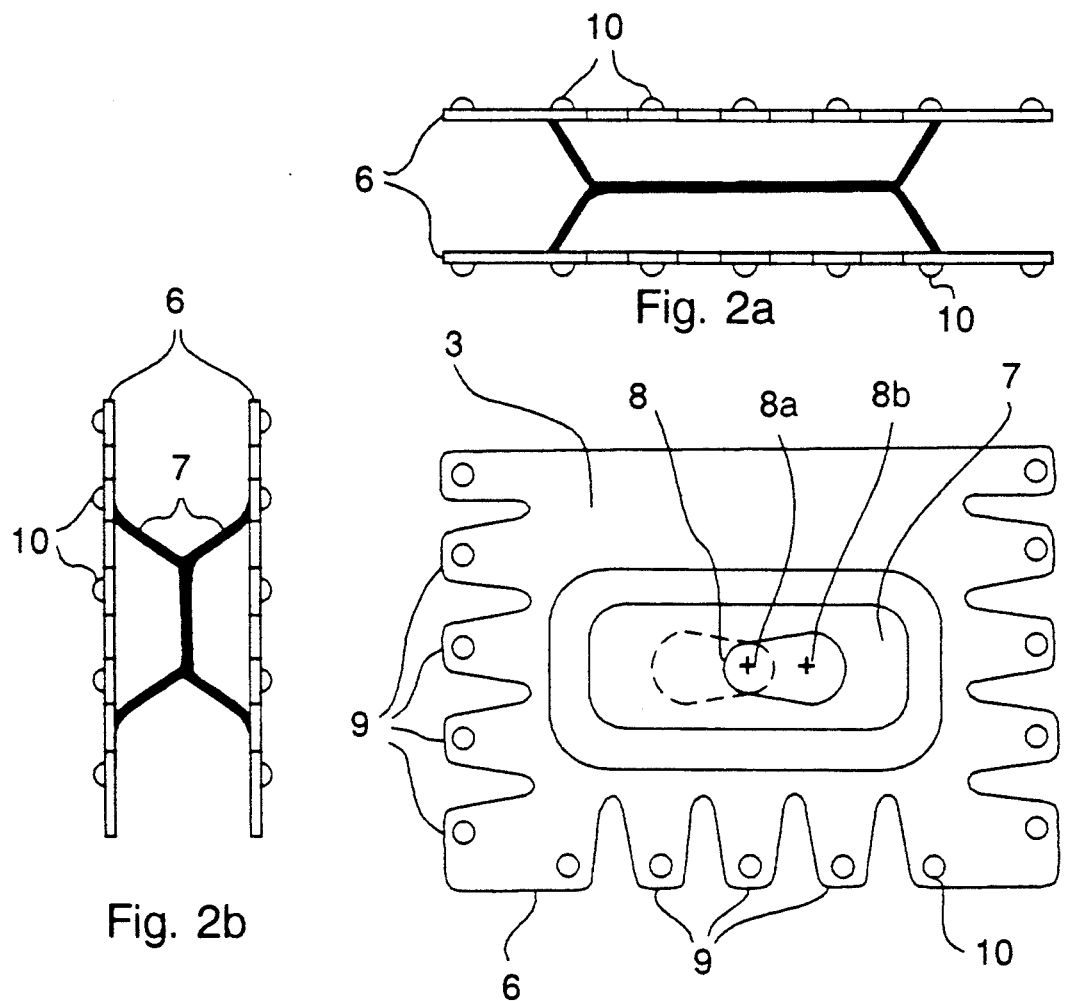

The screening plate 3 is shown in more detail in FIGS. 2, 2a and 2b, from which it will be seen that the plate comprises two identical plate halves 6, each of which is comprised of a flat plate having a central hollow 7. The height of the hollow corresponds to half the distance between the side-walls 4 of the spaces. Arranged centrally of the hollow 7 is an opening 8, which will be described in more detail hereinafter. Tongues or tabs 9 are provided along three sides of the plate-halves, whereas the fourth side, which faces the upper edge of a space when fitting the through-let, lacks the provision of tongues. The tongues 9 are intended to lie resiliently against the side-walls 4, so as to ensure screening contact with said walls. In order to improve the contact of the tongues with the side-walls, the tongues 9 may be provided with projections or beads 10.

The opening 8 in the bottom of the hollow 7 has the form of an elongated aperture with a centrally positioned part 8a whose diameter corresponds to the diameter of the coaxial cable 1 without its sheath, i.e. the cable with screen exposed. The aperture extends on one side of the central part to a part 8b whose diameter is greater than the corresponding smallest diameter of the coaxial cable including its sheath, so as to enable the cable to be inserted into the aperture when fitting the through-let. When the screening plate 3 is assembled, with the two plate-halves 6 soldered together with their respective hollows 7 facing one another, the aperture-parts 8a will coincide to form a common, throughpassing circular opening 8, as illustrated in FIG. 2.

The through-let is fitted by stripping the sheath from the coaxial cable 1 along an appropriate length, whereafter the cable is inserted into the aperture-parts 8b of the plate-halves 6, the halves 6 being turned so that their respective hollows 7 will face towards one another. The plate-halves 6 are then soldered together at the bottoms of the hollows and, at the same time, the screen of the coaxial cable 1 is soldered firmly in the opening formed by the mutually coincident aperture-parts 8a. The through-let is fitted between the spaces, by pressing the screen plate 3 down into the recesses 5a and 5b between the side-walls 4a and 4b so as to seal there against through the medium of their tongues 9. A cover or lid placed over each of said spaces seals against the upper sides of the screening plates 3 and ensures a complete screen.

It will be understood that the invention is not restricted to the aforedescribed and illustrated embodiment thereof, and that modifications can be made within the scope of the following claims.

What is claimed is:

1. A coaxial cable through-let for screening signals transmitted between two adjacent, screened spaces, comprising a coaxial cable provided with a screen, a strippable sheath covering the screen, and electrical contact devices at each end thereof for signal transmission, and a screening plate which surrounds the cable and which is positioned between the two spaces in recesses provided in mutually opposing side-walls thereof, wherein the screening plate has two substantially identical plate-halves, each of which includes a flat, rectangular plate having resilient tongues provided along three sides thereof, and a centrally positioned hollow having a height corresponding to half the distance between the spaces and a coaxial cable opening provided centrally in the hollow, the two plate-halves being soldered together at their mutually facing hollows and also in the openings at the coaxial cable screen at a part thereof from which the cable sheath has been stripped.

2. A through-let according to claim 1, wherein the tongues have beads which face towards the side-walls of said spaces.

3. A through-let according to claim 1, wherein the opening in each plate-half comprises an elongated aperture having a centrally positioned part corresponding to a diameter of the coaxial cable screen, and a part which extends from said centrally positioned part and which has a diameter which corresponds at least to a diameter of the coaxial cable sheath.

* * * * *